United States Patent [19]

Bertram et al.

[11] Patent Number: 4,481,347

[45] Date of Patent: Nov. 6, 1984

[54] EPOXY RESINS CONTAINING PHOSPHORUS

[75] Inventors: James L. Bertram; William Davis, both of Lake Jackson, Tex.

[73] Assignee: The Dow Chemical Company, Midland, Mich.

[21] Appl. No.: 544,044

[22] Filed: Oct. 24, 1983

[51] Int. Cl.$^3$ .............................................. C08G 59/40
[52] U.S. Cl. .................................... 528/102; 525/504; 528/98; 528/99; 528/104; 528/108
[58] Field of Search ................... 528/108, 399, 98, 99, 528/104, 102; 525/504

[56] References Cited

U.S. PATENT DOCUMENTS

| | | | |
|---|---|---|---|
| 3,226,377 | 12/1965 | Seeger et al. | 528/408 X |
| 3,226,382 | 12/1965 | Seeger et al. | 528/408 X |
| 3,516,965 | 6/1970 | Washburn | 260/47 |
| 3,764,582 | 10/1973 | Lorenz | 528/112 X |
| 3,933,738 | 1/1976 | Murch et al. | 260/45.9 NP |

OTHER PUBLICATIONS

"Phosphoramidates as Reactive Fire Retardant Polymer Modifiers," Wilson, Gordon & Hindersinn, *Ind. Chem. Prod. Res. Dev.*, vol. 13, No. 1, 1974, pp. 85–89.

*Primary Examiner*—Earl A. Nielsen
*Attorney, Agent, or Firm*—J. G. Carter

[57] ABSTRACT

Phosphorus-containing epoxy resins are prepared by reacting an epoxy resin with a polyhydric phenolic compound and a phosphoramide.

13 Claims, No Drawings

EPOXY RESINS CONTAINING PHOSPHORUS

BACKGROUND OF THE INVENTION

The present invention pertains to epoxy resins containing phosphorus.

Epoxy resins have heretofore been blended with various phosphorus containing compounds so as to impart fire retardant properties, particularly when bromine is also present in the composition. Also, phosphorus-containing esters have been utilized to incorporate phosphorus into the cured structure. The present invention provides another method for incorporating the phosphorus into the cured structure.

SUMMARY OF THE INVENTION

The present invention concerns a subsequently curable epoxy resin composition prepared by reacting in the presence of a catalytic quantity of a suitable catalyst
  (A) at least one epoxy resin having an average of more than one vicinal epoxy group per molecule,
  (B) at least one phosphoramide represented by the formula

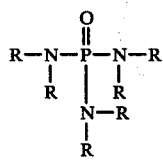

wherein each R is independently hydrogen or a hydrocarbyl or an inertly substituted hydrocarbyl group from 1 to about 20, preferably from 1 to about 10 carbon atoms; and
  (C) at least one compound having an average of more than one aromatic hydroxyl group per molecule;
and
wherein the components are employed in a quantity which provides an epoxy group to total number of hydrogen atoms attached to a nitrogen atom and/or an oxygen atom ratio of from about 2.25:1 to about 10:1, preferably from about 2.5:1 to about 7.5:1 and components (B) and (C) are employed in a quantity which provides a ratio of hydrogen atoms attached to a nitrogen atom to hydrogen atoms attached to an oxygen atom of from about 0.1:1 to about 10:1, preferably from about 0.2:1 to about 3:1 and with the proviso that at least one of components (A) or (C) has an average functionality of not greater than about 2 and when the other component (A) or (C) has a functionality greater than about 2, it is present only in quantities which do not cause the resultant composition to become gelled during the epoxy resin preparation.

The present invention also pertains to the aforementioned phosphorus-containing epoxy resins cured with a curing quantity of a suitable curing system.

DETAILED DESCRIPTION OF THE INVENTION

Suitable phosphoramide compounds which can be employed herein include, for example, methylphosphoramide, dimethylphosphoramide, trimethylphosphoramide, ethylphosphoramide, diethylphosphoramide, triethylphosphoramide, propylphosphoramide, dipropylphosphoramide, tripropylphosphoramide, butylphosphoramide, dibutylphosphoramide, tributylphosphoramide, phenylphosphoramide, diphenylphosphoramide, triphenylphosphoramide, mixtures thereof and the like.

Suitable dihydric and polyhydric phenols which can be employed in the present invention include, for example, those represented by the formulas

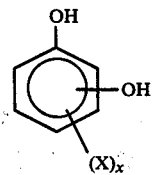

I.

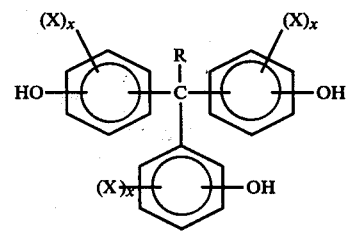

II.

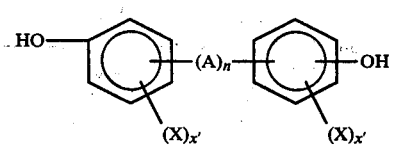

III.

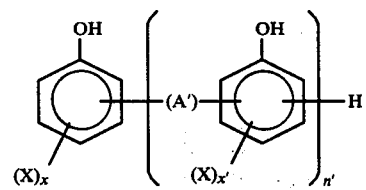

IV.

wherein
  A is a divalent hydrocarbyl group having from 1 to about 10 carbon atoms, —O—, —S—, —S—S—,

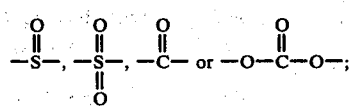

A' is a divalent hydrocarbyl group having from 1 to about 10 carbon atoms; R is hydrogen or a hydrocarbyl group having from 1 to about 10 carbon atoms; each X is independently a monovalent hydrocarbyl group having from 1 to about 10 carbon atoms, or a halogen; n has a value of zero or 1; n' has a value of from about 1.01 to about 7; x has a value of from zero to about 4 and x' has a value of from zero to about 3.

Suitable such phenolic hydroxyl-containing compounds include, for example, resorcinol, catechol, hydroquinone, phloroglucinol, bisphenol A, tetramethylbisphenol A, tetra-tertiarybutylbisphenol A, tetrabromobisphenol A, dihydroxybiphenyl, tetramethyldihydroxybiphenyl, tetrabutyldihydroxybiphenyl, tetramethyltetrabromodihydroxybiphenyl, mixtures thereof and the like.

Suitable epoxy resins which can be employed herein include those represented by the formulas

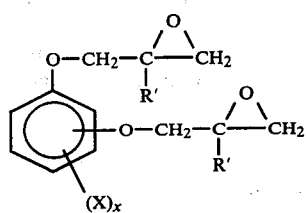

V.

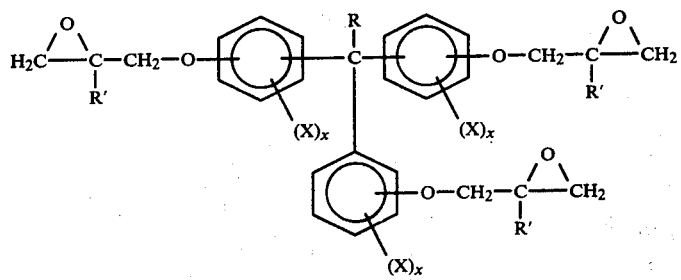

VI.

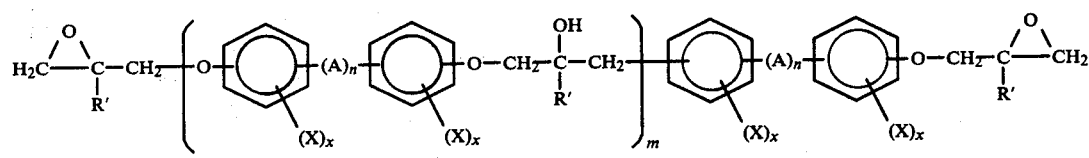

VII.

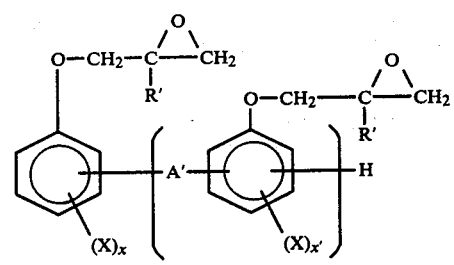

VIII.

wherein each A, A', R, X, n, n', x and x' are as defined in formulas I, II, III and IV, each R' is independently hydrogen or a hydrocarbyl group having from 1 to about 4 carbon atoms and m has an average value of from zero to about 10.

The reaction between the epoxy resin, phenolic compound and the phosphoramide is usually conducted in the presence of a catalyst. Suitable catalysts include quaternary ammonium compounds, phosphonium compounds, sulfonium compounds, tertiary amines, metal hydroxides, metal alkoxides, and the like.

Suitable quaternary ammonium catalysts include, for example, tetramethyl ammonium chloride, benzyl trimethyl ammonium chloride, triethanol ammonium chloride, tetraethanol ammonium hydroxide, dodecyl dimethylbenzyl ammonium naphthenate and the like.

Suitable phosphonium catalysts include, for example, those quaternary phosphonium compounds disclosed in U.S. Pat. Nos. 3,948,855; 3,477,990 and 3,341,580 and Canadian Pat. No. 858,648 all of which are incorporated herein by reference. Particularly suitable such catalysts include, for example, ethyl triphenyl phosphonium iodide, ethyl triphenyl phosphonium bicarbonate, ethyl triphenyl phosphonium acetate.acetic acid complex, benzyl triphenyl phosphonium chloride, tetrabutyl phosphonium chloride, benzyl trimethyl ammonium chloride, mixtures thereof and the like.

Suitable sulfonium catalysts include thiourea catalysts such as, for example, tetramethyl thiourea; N,N'-dimethyl thiourea; N,N'-diphenyl thiourea; mixtures thereof and the like as well as thiodiethanol and other sulfonium precursors.

Suitable tertiary amines include, for example, diethylenetriamine, N-methylmorpholine, triethylamine, tributylamine, benzyldimethylamine, tris(dimethylaminomethyl)phenol, mixtures thereof and the like.

Also suitable as catalysts are the basic ion exchange resins such as, for example, DOWEX MSA-1, DOWEX 11, DOWEX SBR, mixtures thereof and the like.

The reaction can be conducted at a temperature of from about 60° C. to about 250° C., preferably from about 120° C. to about 180° C., and at a pressure of from about 0.1 mm of Hg to about 2280 mm of Hg, preferably from about 700 mm of Hg to about 1520 mm of Hg for a time sufficient to complete the reaction to the degree desired. The actual time varies with temperature and pressure, but usually times of from about 60 min. (3600 s) to about 8 hours (28800 s) is sufficient.

Suitable curing agents and/or catalysts which can be employed include, for example, amines, acids and anhydrides thereof, biguanides, imidazoles, urea-aldehyde resins, melamine aldehyde resins and the like. These and other curing agents and/or catalysts are disclosed in Lee and Neville's *HANDBOOK OF EPOXY RESINS*, McGraw-Hill, 1967 which is incorporated herein by reference.

bromobisphenol A with bisphenol A were prepared. The reactants and results are given in the following Table I.

TABLE I

|  | EXAMPLE 3 | EXAMPLE 4 | EXAMPLE 5 | EXAMPLE 6 |
|---|---|---|---|---|
| EPOXY RESIN, grams | 71.5 | 70.2 | 71.3 | 71.5 |
| equiv. | 0.38 | 0.37 | 0.38 | 0.38 |
| Tetrabromobisphenol A, grams | 15.3 | 17.8 | 21.4 | 22.9 |
| equiv. | 0.056 | 0.065 | 0.079 | 0.084 |
| Bisphenol A, grams | 4.0 | 4.0 | 0.83 | 0.83 |
| equiv. | 0.035 | 0.035 | 0.0073 | 0.0073 |
| N,N',N''—triphenylphosphoramide, grams | 9.6 | 8.1 | 6.4 | 5.0 |
| equiv. | 0.089 | 0.075 | 0.059 | 0.046 |
| ethyltriphenylphosphonium-acetate.acetic acid complex, grams | 0.1 | 0.1 | 0.1 | 0.1 |
| milliequiv. | 0.24 | 0.24 | 0.24 | 0.24 |
| EPOXIDE CONTENT, % | 10.5 | 10.5 | 10.5 | 10.5 |
| EEW | 410 | 410 | 410 | 410 |
| Calculated % Phosphorus | 0.92 | 0.78 | 0.62 | 0.48 |
| Calculated % Bromine | 8.9 | 10.4 | 12.5 | 13.3 |

The compositions of the present invention are useful in the preparation of castings, laminates, coatings and the like.

In addition to the epoxy resin and curing agent, the compositions can contain pigments, dyes, fillers, flow control agents, solvents, rubber modifiers, combinations thereof and the like. Also, reinforcing materials such as fibers, filaments, woven cloth mats and the like prepared from various materials such as fiberglass, graphite, nylon, rayon and the like can be employed.

The following examples are illustrative of the invention but are not to be construed as to limiting the scope thereof in any manner.

EXAMPLE 1

Into a suitable reaction vessel equipped with means for stirring, temperature control, condensing of vapors and nitrogen purging was added 71.94 g (0.38 equiv.) of a diglycidyl ether of bisphenol A having an average epoxide equivalent weight (EEW) of about 187.4, 21.57 g (0.079 equiv.) of tetrabromobisphenol A, 6.5 g (0.06 equiv.) of N,N',N''-triphenylphosphoramide and 0.1 g of ethyl triphenyl phosphonium acetate.acetic acid complex. This mixture was stirred and heated under nitrogen at 150° C. for 5 hours (18,000 s). The epoxide content was 9.99% (430 EEW). The resin was cooled and diluted with 33.33 g of aceton. The resin before dilution was calculated to contain 0.62% phosphorus and 12.6% bromine.

EXAMPLE 2

Employing the procedure of Example 1, 73.64 g (0.38 equiv.) of a diglycidyl ether of bisphenol A having an average EEW of 194, 21.36 g (0.078 equiv.) of tetrabromobisphenol A, 5 g (0.057 equiv.) of N,N',N''-tributylphosphoramide and 1 g of ethyltriphenylphosphonium acetate.acetic acid complex were heated while stirring at 150° C. for 2 hours (7200 s). At this time the epoxide content was 9.9% (434 EEW). The calculated phosphorus and bromine contents were 0.59% and 12.5% respectively. The resin was cooled and diluted with 33.33 g of acetone.

EXAMPLES 3-6

Various resin compositions employing the procedure of Example 1 but varying the quantity of components and in some cases replacing a portion of the tetra-

EXAMPLES 7-12

The resins in Examples 1-6 were formulated with dicyanamide and benzyldimethylamine in such a manner as to give approximately equivalent cure rates compared to a standard control based on D.E.R. ®511 A80. The formulations were cured for one hour (3600 s) at 175° C., then analyzed for glass transition temperature via a DuPont model 1090 Differential Scanning Calarometer. The results are given in Table II.

TABLE II

| RESIN # | DICYANAMIDE PHR.* | BDMA (WT. %) | Tg (°C.) |
|---|---|---|---|
| Ex. 1 | 4 | 0.5 | 122 |
| Ex. 2 | 4 | 0.5 | 120.6 |
| Ex. 3 | 3 | 1.5 | 116.1 |
| Ex. 4 | 3 | 1.5 | 116.4 |
| Ex. 5 | 3 | 1.5 | 117.4 |
| Ex. 6 | 3 | 1.5 | 110.9 |
| Comparative Experiment | | | |
| D.E.R. ® 511 | 3 | 0.3 | 111 |

*PHR = parts per hundred parts resin

We claim:

1. An epoxy resin composition prepared by reacting in the presence of a catalytic quantity of a suitable catalyst
   (A) at least one epoxy resin having an average of more than one vicinal epoxy group per molecule,
   (B) at least one phosphoramide represented by the formula

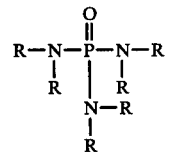

wherein each R is independently hydrogen or a hydrocarbyl or an inertly substituted hydrocarbyl group having from 1 to about 20 carbon atoms; and
   (C) at least one compound having an average of more than one aromatic hydroxyl group per molecule; and wherein the components are employed in a quantity which provides an epoxy group to total number of hydrogen atoms attached to a nitrogen atom and/or an oxygen atom ratio of from about 2.25:1 to about 10:1, and components (B) and (C) are employed in a quantity which provides a ratio of hydrogen atoms attached to a nitrogen atom to hydrogen atoms attached to an oxygen atom of from about 0.1:1 to about 10:1, and with the proviso that at least one of components (A) or (C) has an average functionality of not greater than about 2 and when the other component (A) or (C) has a functionality greater than about 2, it is present only in quantities which do not cause the resultant composition to become gelled.

2. An epoxy resin composition of claim 1 wherein (a) the components are employed in a quantity which provides an epoxy group to total number of hydrogen atoms attached to a nitrogen atom and/or an oxygen atom ratio of from about 2.5:1 to about 7.5:1 and (b) components (B) and (C) are employed in a quantity which provides a ratio of hydrogen atoms attached to a nitrogen atoms to hydrogen atoms attached to an oxygen atom of from about 0.2:1 to about 3:1.

3. A composition of claim 2 wherein components (A) and (C) each have an average functionality of about 2.

4. A composition of claim 3 wherein component (A) is a diglycidyl ether of bisphenol A, component (B) is N,N',N''-triphenylphosphoramide; and component (C) is bisphenol A, tetrabromobisphenol A or a mixture thereof.

5. A composition comprising an epoxy resin of claim 1 and a curing quantity of a suitable curing system for said epoxy resin composition.

6. A composition comprising an epoxy resin of claim 2 and a curing quantity of a suitable curing system for said epoxy resin composition.

7. A composition comprising an epoxy resin of claim 3 and a curing quantity of a suitable curing system for said epoxy resin composition.

8. A composition comprising an epoxy resin of claim 4 and a curing quantity of a suitable curing system for said epoxy resin composition.

9. A product resulting from curing a composition of claim 5.

10. A product resulting from curing a composition of claim 6.

11. A product resulting from curing a composition of claim 7.

12. A product resulting from curing a composition of claim 8.

13. A product resulting from curing a composition of claim 9.

* * * * *